US006252023B1

(12) United States Patent
Moren

(10) Patent No.: US 6,252,023 B1
(45) Date of Patent: Jun. 26, 2001

(54) ORGANOBORANE AMINE COMPLEX INATATOR SYSTEMS AND POLYMERIZABLE COMPOSITIONS MADE THEREWITH

(75) Inventor: Dean M. Moren, North St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/272,152

(22) Filed: Mar. 19, 1999

(51) Int. Cl.[7] ....................................................... C08F 4/52
(52) U.S. Cl. ........................... 526/196; 526/134; 502/200; 502/202; 502/162; 502/170; 564/1; 564/8; 564/9; 428/355 R
(58) Field of Search ........................... 564/1, 8, 9; 502/200, 502/202, 162, 170; 526/134, 196; 428/355 R

(56) References Cited

U.S. PATENT DOCUMENTS

| | | | |
|---|---|---|---|
| 2,985,633 | 5/1961 | Welch et al. | 260/85.3 |
| 3,141,862 | 7/1964 | Kirshenbaum et al. | 260/45.5 |
| 3,275,611 | 9/1966 | Mottus et al. | 260/80.5 |
| 3,340,193 | 9/1967 | Fields et al. | 252/56 |
| 3,418,260 | 12/1968 | Trofimenko | 260/2 |
| 3,425,988 | 2/1969 | German et al. | 260/47 |
| 3,451,952 | 6/1969 | Slocombe | 260/2.5 |
| 3,476,727 | 11/1969 | Lo Monaco et al. | 260/92.8 |
| 3,527,737 | 9/1970 | Masuhara et al. | 260/78.5 |
| 3,829,973 | 8/1974 | Masuhara et al. | 32/15 |
| 4,167,616 | 9/1979 | Bollinger | 526/197 |
| 4,379,728 | 4/1983 | Lin | 156/307.3 |
| 4,485,229 | 11/1984 | Waddill et al. | 528/111 |
| 4,515,724 | 5/1985 | Ritter | 260/410 |
| 4,524,181 | 6/1985 | Adam et al. | 525/107 |
| 4,638,092 | 1/1987 | Ritter | 568/1 |
| 4,639,498 | 1/1987 | Ritter | 526/196 |
| 4,656,229 | 4/1987 | Chiao | 525/518 |
| 4,676,858 | 6/1987 | Ritter | 156/307.3 |
| 4,684,538 | 8/1987 | Klemarczyk | 427/54.1 |
| 4,721,751 | 1/1988 | Schappert et al. | 524/773 |
| 4,731,416 | 3/1988 | Saunders | 525/131 |
| 4,775,734 | 10/1988 | Goel | 528/89 |
| 4,874,814 | 10/1989 | Cartier et al. | 525/61 |
| 4,904,360 | 2/1990 | Wilson, Jr. et al. | 204/181.7 |
| 4,920,188 | 4/1990 | Sakashita et al. | 526/196 |
| 4,921,921 | 5/1990 | Ritter | 526/195 |
| 4,985,516 | 1/1991 | Sakashita et al. | 526/196 |
| 5,021,507 | 6/1991 | Stanley et al. | 525/127 |
| 5,106,928 | * 4/1992 | Skoultchi et al. | 526/196 |
| 5,143,884 | 9/1992 | Skoultchi et al. | 502/160 |
| 5,286,821 | 2/1994 | Skoultchi | 526/196 |
| 5,310,835 | 5/1994 | Skoultchi et al. | 526/198 |
| 5,376,746 | 12/1994 | Skoultchi | 526/196 |
| 5,401,805 | 3/1995 | Chung et al. | 525/288 |
| 5,539,070 | 7/1996 | Zharov et al. | 526/198 |
| 5,616,796 | 4/1997 | Pocius et al. | 526/8 |
| 5,621,143 | 4/1997 | Pocius | 564/8 |
| 5,681,910 | 10/1997 | Pocius | 526/198 |
| 5,684,102 | 11/1997 | Pocius et al. | 526/198 |
| 5,686,544 | 11/1997 | Pocius | 526/196 |
| 5,690,780 | 11/1997 | Zharov et al. | 526/198 |
| 5,691,065 | 11/1997 | Zharov et al. | 428/421 |
| 5,718,977 | 2/1998 | Pocius | 428/422 |
| 5,795,657 | 8/1998 | Pocius et al. | 428/516 |
| 5,872,197 | 2/1999 | Deviny | 526/196 |
| 5,883,208 | 3/1999 | Deviny | 526/198 |

FOREIGN PATENT DOCUMENTS

| | | | |
|---|---|---|---|
| 649582 | 10/1993 | (AU) . | |
| 664459 | 6/1963 | (CA) | 401/104 |
| 2061021 | 10/1992 | (CA) | C09D/157/00 |
| 0 051 796 | 10/1981 | (EP) | C09J/3/14 |
| 0 511 464 A1 | 11/1992 | (EP) | C09J/4/00 |
| 904403 | 8/1962 | (GB) . | |
| 988632 | 4/1965 | (GB) . | |
| 1113722 | 5/1968 | (GB) . | |
| 1132261 | 10/1968 | (GB) . | |
| 42-14318 | 8/1967 | (JP) . | |
| 45-29195 | 9/1970 | (JP) . | |
| 46-16888 | 5/1971 | (JP) | B01J/000/00 |
| 48-18928 | 6/1973 | (JP) | C09J/5/00 |
| 53-102394 | 9/1978 | (JP) | C08F/4/40 |
| 62-288675 | 12/1987 | (JP) | C09J/3/14 |
| 3-177470 | 8/1991 | (JP) . | |
| 3-264509 | 11/1991 | (JP) | A61K/6/00 |
| 7-89821 | 9/1993 | (JP) | A61K/6/00 |
| WO 99/64475 | 12/1999 | (WO) . | |
| WO 99/64528 | 12/1999 | (WO) . | |

OTHER PUBLICATIONS

The Trialkylborane–initiated Graft Copolymerization of Methyl Methacrylate onto Hemoglobin, K. Kogima, S. Iwabuchi and K. Kojima, *Bulletin of the Chemical Society of Japan*, vol. 44, pp. 1891–1895 (1971).

A New Method for the Graft Copolyermerization of Methyl Methacrylate onto Proteins and Fibers, *Polymer Letters*, vol. 9, pp. 25–29 (1971).

The Grafting of Methyl Methacrylate onto Cotton by Tri–*n*–butylborane, K. Kojim, S. Iwabuchi, K. Murakami, K. Kojima and F. Ichikawa, *Journal of Applied Polymer Science*, vol. 16, pp. 1139–1148 (1972).

Grafting of Vinyl Monomers by Tri–*n*–Butylborane onto Chlorophyll and Related Compounds, *Polymer Letters Edition*, vol. 13, pp. 361–363 (1975).

(List continued on next page.)

Primary Examiner—David W. Wu
Assistant Examiner—Ling-Siu Choi
(74) *Attorney, Agent, or Firm*—Steven E. Skolnick; Scott A. Bardell

(57) ABSTRACT

A composition comprises organoborane amine complex and 1,4-dioxo-2-butene-functional material. The composition can form a part of a polymerization initiator system that also includes a compound that is reactive with the amine portion of the complex. The system can be used to initiate polymerization of acrylic monomer and to form an acrylic adhesive that has exceptionally good adhesion to low surface energy polymers.

10 Claims, No Drawings

OTHER PUBLICATIONS

Tributylborane–Initiated Grafting of Methyl Methacrylate onto Chitin, K. Kojima, M. Yoshikuni and T. Suzuki, *Journal of Applied Polymer Science*, vol. 24, pp. 1587–1593 (1979).

Grafting of Methyl Methacrylate onto Silk Fibers Initiated by Tri–*n*–Butylborane, M. Tsukada, T. Yamamoto, N. Nakabayashi, H. Ishikawa and G. Freddi, *Journal of Applied Polymer Science*, vol. 43, pp. 2115–2121 (1991).

Molecular Weight Distribution of the Methyl Methacrylate (MMA) Polymer Separated form the MMA–Grafted Silk Fiber, M. Tsukada, Y. Goto, G. Freddi, T. Yamamoto and N. Nakabayashi, *Journal of Applied Polymer Science*, vol. 44, pp. 2197–2202 (1992).

Synthesis of Functionalized Polypropylene and Polypropylene–Polymehtylmethacrylate Graft Copolymer, D. Rhubright and T.C. Chung, Proceedings of the American Chemical Society, *Polymeric Materials Science and Engineering*, vol. 67, pp. 112–113 (1992).

Polymerization of Acrylonitrile in Presence of Tributylborine, G. Kolesnikov and L. Fedorova, translated from *Bull. Acad. Sci. USSR, Div. Chem. Sci.*, p. 236 (1957).

Tributylborine: A Catalyst for the Polyermization of Unsaturated Compounds, G. Kolesnikov and N.V. Klimentova, translated from *Bull. Acad. Sci. USSR, Div. Chem. Sci.*, p. 236 (1957).

Triethylboron as an Initiator for Vinyl Polymerization, J. Furukawa, T. Tsuruta and S. Inoue, *Journal of Polymer Science*, vol. XXVI, Issue No. 113, pp. 234–236 (1957).

Oxygen Compounds as Cocatalyst for Triethylboron–Catalyzed Vinly Polymerization, J. Furukawa and T. Tsuruta, *Journal of Polymer Science*, vol. XXVII, Issue No. 116, pp. 227–229 (1958).

Mechanism of the Polymerization of Acrylonitrile in Presence of Tributylborine, G. Kolesnikov and L. Fedorova, translated from *Bull. Acad. Sci. USSR, Div. Chem. Sci.*, p. 906 (1958).

Mechanism of Trialkylboron Initiated Polymerization, J. Fordham and C. Sturm, *Journal of Polymer Science*, vol. XXXIII, No. 126, pp. 503–504 (1958).

Cocatalytic Activity of Some Metal Salts on Vinyl Polmerization with Tributhylboron, I. M. Panayotov, *Comptes rendus de l'Academie bulgare des Sciences*, vol. 14, No. 2, pp. 147–150 (1961).

Polymerization with Organoboron Compounds, F. Arimoto, *Journal of Polymer Science: Part A–1*, vol. 4, pp. 275–282 (1966).

On the Existence of a Free–Radical Organoboron Complex in the Polymerization of Methyl Methacrylate, R. Kern and J. Schaefer, *Polymer Letters*, vol. 5, pp. 157–162 (1967).

Vinyl Monomer Polymerization Mechanism in the Presence of Trialkylboranes, J. Grotewold, E. Lissi and A. Villa, *Journal of Polymer Science: Part A–1*, vol. 6, pp. 3157–3162 (1968).

Free Radical Polymerization of Methyl Methacrylate in the Presence of Trialkylboranes, P. Brindley and R. Pearson, *Polymer Letters*, vol. 6, pp. 831–835 (1968).

Ethylene Polymerization in Presence of Tributylboron, G. Kolesnikov and T. Soboleva, *Scientific and Research Publications of the Members of the All Union Chemical Society Named Aftger Mendilev*, vol. 2, p. 663 (1957).

Studies on Dental Self–Curing Resins (II), S. Fujisawa, Y. Imai and E. Masuhara *Reports of the Institute for Medical & Dental Engineering*, vol. 3, pp. 64–71 (1969).

Free–Radical Copolymerization of 1,2–Dichloroethylenes. Evidence for Chain Transfer by Chlorine Atom Elimination, T. Dawson, R. Lundberg and F. Welch, *Journal of Polymer Science: Part A–1*, vol. 7, pp. 173–181 (1969).

Mechanism of Vinyl Monomer Polymerization in the Presence of Trialkylboranes and Inhibitors, E. Arnachibia et al., *Journal of Polymer Science: Part A–1*, vol. 7, pp. 3430–3433 (1969).

Polymerization of Methyl Methacrylate by Trialkylborane–Pyridine System, K. Kojima et al., *Polymer Letters*, vol. 8, pp. 541–547 (1970).

Polymerization Initiated by Triethylborane–Peroxide Mixtures, E. Abuin et al., *Polymer Letters*, vol. 7, pp. 515–518 (1970).

Polymerization of Methyl Methacrylate by Co–ordination Compounds of Tri–*n*–butylborane with Some Electron–donating Compounds, Kojima et al., *Research Report of the Chiba University Faculty of Engineering*, vol. 22, No. 41, pp. 47–55.

Polymerization of Methyl Methacrylate Initiated by Tri–*n*–butylborane–Organic Halide Systems, M. Yoshikuni, M. Asami, S. Iwabuchi and K. Kojima, *Journal of Polymer Science*, vol. 11, pp. 3115–3124 (1973).

Polymerization of Methyl Methacrylate Initiated by Tributylborane–Pyridine System, Kojima et al., *Journal of the Japanese Chemical Society*, No. 11, pp. 2165–2171 (1972).

The Copolymerization of Vinylhydroquinone and Acrylonitrile by Tri–*n*–butylborane, S. Iwabuchi, M. Ueda, M. Kobayashi and K. Kojima, *Polymer Journal*, vol. 6, No. 2 pp. 185–190 (1974).

Free Radical Polymerization in the Presence of Triethylborane, E. Abuin, J. Cornejo and E. Lissi, *European Polymer Journal*, vol. 11, pp. 779–782 (1975).

Polymerization of Methyl Methacrylate by tri–n–butylborane in the presence of amino acid esters, K. Kojima, S. Iwabuchi, Y. Moriya and M. Yoshikuni, *Polymer*, vol. 16, pp. 601–604 (1975).

Analysis of Mechanism of Radical Formation Resulted form the Initiator System of Triethylboron and Oxygen by Spin Trapping Technique, Sato et al., *Journal of the Japanese Chemical Society*, No. 6, pp. 1080–1084 (1975).

Development of Adhesive Pit and Fissure Sealants Using a MMA Resin Initiated by a Tri–*n*–butyl Borane Derivative, N. Nakabayashi and E. Masuhara, *Journal of Biomedical Materials Research*, vol. 12, pp. 149–165 (1978).

Vinyl Acetate Polymerization Initiated by Alkylborane–oxidizer–type Systems, S. Ivanchev, L. Shumnyi and V. Konovalenko, *Polymer Science U.S.S.R.*, vol. 22, No. 12, pp. 8000–8006 (1980).

Preparation of Hard Tissue Compatible Materials: Dental Polymers, N. Nakabayashi and E. Masuhara, *Biomedical Polymers*, pp. 85–111 (1980).

Mechanism of Initiation of Polymerization of Vinyl Monomers by Means of the Trialkylborane–Acid System, S. Ivanchev and L. Shumnyi, translated from Doklady Akademii Nauk SSSR, vol. 270, No. 5, pp. 1123–1126 (1983).

Effect of Organic Bases on Initiating Properties in the System Boronalkylelemental Organic Peroxide During Vinylchloride Polymerization, T. Guzanova, Master Thesis of the Fifth (graduate) year student, Ministry of High and Secondary Special Education Russia, Gorky State University (1983).

Application of Spin Trapping Technique to Radical Polymerization, 20, T. Sato, N. Fukumura and T. Otsu, *Makromol. Chem.*, 184, pp. 431–442 (1983).

Importance of Polymerization Initiator Systems and Interfacial Initiation of Polymerization in Adhesive Bonding of Resin to Dentin, Y. Imai, Y. Kadoma, K. Kojima, T. Akimoto, K. Ikakura and T. Ohta, *J. Dent. Res.,*, vol. 70, No. 7, pp. 1088–1091 (1991).

Vibrational Analysis by Raman Spectroscopy of the Interface Between Dental Adhesive Resin and Dentin, M. Suzuki, H. Kato and S. Wakumoto, *J. Dent. Res.*vol. 70, No. 7, pp. 1092–1097 (1991).

Laser–Raman Spectroscopic Study of the Adhesive Interface Between 4–MET/MMA–TBB Resin and Hydroxyapatite or Bovine Enamel, M. Ozaki, M. Suzuki, K. Itoh and S. Wakumoto, *Dental Materials Journal*, vol. 10, No. 2, pp. 105–120 (1991).

Polymerization of Some Vinyl Monomers on Triisobutylboron–Containing Radical Initiators in the Presence of Hydroquinone and Benzoquinone, V. Dodonov and D. Grishin, *High Molecular Compounds*, vol. 35, No. 3 pp. 137–141 (1993).

Synthesis of PP–g–PMMA, PP–g–PVA and PP–g–PCL Copolymers, D. Rhubright and T. Chung, American Chemical Society, Division of Polymer Chemistry, Papers Presented at the Chicago, Illinois Meeting, vol. 34, No. 2, pp. 560–561 (1993).

Functionalized and Grafted Polyolefin Copolymers Prepared by Tansition Metla Catalysts and Borane Monomers, T. Chung, *Polymer Preprints*, vol. 35, No. 1, pp. 674–675 (1994).

Photochemical Modification of Fluorocargon Resin Surface to Adhere with Epoxy Resin, M. Okoshi, T. Miyokawa, H. Kashiura and M. Murahara, *Mat. Res. Soc. Symp. Proc.*, vol. 334, pp. 365–371 (1994).

Chemical Abstract No. 88532r, *Chemical Abstracts*, vol. 73, 1970.

Chemical Abstract No. 134385q, *Chemical Abstracts*, vol. 80, 1974.

* cited by examiner

ORGANOBORANE AMINE COMPLEX INATATOR SYSTEMS AND POLYMERIZABLE COMPOSITIONS MADE THEREWITH

BACKGROUND OF THE INVENTION

1. Field of the Invention

This invention relates generally to organoborane amine complex initiator systems and, more specifically, to systems in which the complex is carried in a 1,4-dioxo-2-butene-functional material. The invention further relates to polymerizable compositions made therewith, particularly two-part acrylic adhesive compositions. The adhesive compositions have excellent adhesion to a variety of substrates, especially low surface energy polymers.

2. Description of the Related Art

An efficient, effective means for adhesively bonding low surface energy plastic substrates such as polyethylene, polypropylene and polytetrafluoroethylene (e.g., TEFLON) has long been sought. The difficulties in adhesively bonding these materials are well known. See, for example, "Adhesion Problems at Polymer Surfaces" by D. M. Brewis that appeared in *Progress in Rubber and Plastic Technology*, volume 1, page 1 (1985).

The conventional approaches often use complex and costly substrate surface preparation techniques such as flame treatment, corona discharge, plasma treatment, oxidation by ozone or oxidizing acids, and sputter etching. Alternatively, the substrate surface may be primed by coating it with a high surface energy material. However, to achieve adequate adhesion of the primer, it may be necessary to first use the surface preparation techniques described above. All of these techniques are well known, as reported in *Treatise on Adhesion and Adhesives* (J. D. Minford, editor, Marcel Dekker, 1991, New York, volume 7, pages 333 to 435). The known approaches are frequently customized for use with specific substrates. As a result, they may not be useful for bonding low surface energy plastic substrates generally.

Moreover, the complexity and cost of the presently known approaches do not render them particularly suitable for use by the retail consumer (e.g., home repairs, do-it-yourselfers, etc.) or in low volume operations. One vexing problem is the repair of many inexpensive everyday household articles that are made of polyethylene, polypropylene or polystyrene such as trash baskets, laundry baskets and toys.

Consequently, there has been a considerable and long felt need for a simple, easy to use adhesive that can readily bond a wide variety of substrates, especially low surface energy materials, such as polyethylene, polypropylene and polytetrafluoroethylene, without requiring complicated surface preparation, priming and the like.

While an adhesive that can bond low surface energy plastics is certainly advantageous, the commercial utility of such an adhesive would be enhanced if the components thereof could be combined in a convenient mix ratio. This would permit facile application of the adhesive using conventional adhesive dispensers without the need for laborious hand weighing and mixing of the different components. However, the convenient mix ratio should not come at the expense of significantly reduced storage stability or performance. Thus, there is not only a need for an adhesive that can bond low surface energy plastics, but a need for such an adhesive that can be readily blended in a convenient mix ratio.

It may be desirable for such adhesives to possess other attributes. For example, polymerizable acrylic adhesives are often associated with a strong and unpleasant odor. While not affecting performance, the odor may discourage some people from using these adhesives and encourage them to select other, perhaps more expensive, alternatives. In addition, for certain situations, it may be helpful to have a readily crosslinkable adhesive to form the high strength adhesive bonds demanded in structural bonding applications.

In still other settings it may be desirable for the adhesive to display an extended shelf-life; that is, to remain stable at room temperature for an extended period of time. In this manner, special storage conditions such as refrigeration can be avoided without substantially reducing the storage life of the product. The likelihood that product would need to be discarded because it has been stored beyond its shelf-life would also be reduced. Similarly, stability at elevated temperatures (for example, in excess of 150° F.) for an extended period of time may also be desirable if the adhesive will be exposed to such temperatures prior to use. This could occur during shipping or if the adhesives are inventoried in warehouses or other storage facilities located in hot weather climates but which are not air conditioned.

Some adhesive compositions are subject to yellowing or other discoloration upon exposure to heat or ultraviolet radiation. This can be undesirable if the adhesive composition is used to bond transparent or translucent substrates or if the adhesive bond line will otherwise be visible. For such applications an adhesive composition that remains white or opaque upon exposure to heat and ultraviolet radiation may be preferred.

As explained more fully hereinbelow, organoborane amine complex initiator systems and related compositions of the invention (which include 1,4-dioxo-2-butene-functional material and acrylic monomer that can polymerize to acrylic adhesives) can address these demands and offer many other advantages.

Organoboranes such as tributylborane and triethylborane have been reported to initiate and catalyze the polymerization of vinyl monomers (see, for example, G. S. Kolesnikov et al., Bull. Acad. Sci. USSR, Div. Chem. Sci. 1957, p. 653, J. Furakawa et al., Journal of Polymer Science, volume 26, issue 113, p. 234, 1957; and J. Furakawa et al., Journal of Polymer Science, volume 28, issue 116, 1958). The organoborane compounds of the type described in these references are known to be quite pyrophoric in air which complicates facile use.

Chemical Abstracts No. 134385q (volume 80, 1974) "Bonding Polyolefin or Vinyl Polymers" reports that a mixture of 10 parts methyl methacrylate, 0.2 part tributylborane, and 10 parts poly(methylmethacrylate) was used to bond polyethylene, polypropylene and poly(vinyl acetate) rods.

U.S. Pat. No. 3,275,611 to E. H. Mottus et al. discloses a process for polymerizing olefinic compounds (e.g., methacrylate monomers) with a catalyst comprising an organoboron compound, a peroxygen compound, and an amine. The organoboron compound and the amine may be added to the reaction mixture separately or they may be added as a preformed complex.

British Patent Specification No. 1,113,722 "Aerobically Polymerisable Compositions," published May 15, 1968 discloses the polymerization of acrylate monomers through the use of a free-radical catalyst (e.g., peroxides) and triarylborane complexes having the general formula $(R)_3B$-Am wherein R is an aryl radical and Am is an amine. The resulting compositions are reportedly useful as adhesives.

Chemical Abstracts No. 88532r (volume 73, 1970) "Dental Self-curing Resin" and the full text paper to which it refers report that tributylborane can be made stable in air by complexing it with ammonia or certain amines and that the tributylborane can be reactivated with an amine acceptor such as an isocyanate, an acid chloride, a sulfonyl chloride, or acetic acid anhydride. As a result, the complex can be used to polymerize blends of methyl methacrylate and poly(methylmethacrylate) to provide a dental adhesive.

U.S. Pat. No. 4,638,092 to Ritter discloses organic boron polymers and their use to start polymerizations. The organo-boron compounds are characterized by the fact that the boron-containing radicals are connected to an organic polymer matrix that is largely non-reactive when exposed to atmospheric oxygen. The polymer matrix can be obtained by polymerizing diolefins, by copolymerizing diolefins with alpha-olefins, or by the polycondensation of diols or diamines with dicarboxylic acids containing olefin groups such as maleic acid and fumaric acid. U.S. Pat. No. 4,639,498, also to Ritter, describes the use of the organo-boron compounds to provide two component adhesives.

A series of patents issued to Skoultchi or Skoultchi et al. (U.S. Pat. Nos.: 5,106,928; 5,143,884; 5,286,821; 5,310,835; and 5,376,746) disclose a two-part initiator system that is reportedly useful in acrylic adhesive compositions, especially elastomeric acrylic adhesives. The first part of the two-part system includes a stable organoborane amine complex and the second part includes a destabilizer or activator such as an organic acid or an aldehyde.

A series of patents issued to Zharov et al. (U.S. Pat. Nos.: 5,539,070; 5,690,780; and 5,691,065) disclose a polymerizable acrylic composition that comprises at least one acrylic monomer, an effective amount of certain organoborane amine complexes, and an effective amount of an acid for initiating polymerization of the acrylic monomer. The acrylic composition is especially useful as an acrylic adhesive for bonding low surface energy polymers.

A series of patents issued to Pocius et al. (U.S. Pat. Nos.: 5,616,796; 5,684,102; and 5,795,657) disclose polymerizable acrylic compositions that comprise acrylic monomer, organoborane polyamine complex, and a material reactive with amine. Polymerizable acrylic monomer compositions useful as adhesives for bonding low surface energy polymers can be prepared. The polyamine is the reaction product of a diprimary amine-terminated material, and a material having at least two groups reactive with primary amine.

U.S. Pat. Nos. 5,621,143, 5,681,910 and 5,718,977 to Pocius disclose polymerizable acrylic monomer compositions that comprise acrylic monomer, organoborane polyoxyalkylene polyamine complex, and an amine reactive compound. The compositions are useful as adhesives for bonding low surface energy polymers.

In U.S. Pat. No. 5,686,544 Pocius discloses a polyurethane/polyurea acrylic adhesive composition that has exceptionally good adhesion to low surface energy polymers. The adhesive composition comprises acrylic monomer, organoborane polyamine complex, polyol and polyisocyanate.

SUMMARY OF THE INVENTION

In general, this invention pertains to polymerization initiator systems that are particularly useful in providing two-part curable compositions, especially those that are acrylic adhesives. Broadly, and in one aspect of the invention, the polymerization initiator systems include an organoborane amine complex and an 1,4-dioxo-2-butene-functional material. Preferably, the complex and the 1,4-dioxo-2-butene-functional material form a solution (even more preferably a liquid solution) at room temperature.

A variety of organoborane amine complexes may be used in the invention and the following structure is representative of those that are suitable:

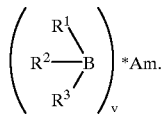

In this structure:

$R^1$ is an alkyl group having 1 to 10 carbon atoms;

$R^2$ and $R^3$ are independently selected from alkyl groups having 1 to 10 carbon atoms and phenyl-containing groups;

Am is an amine which may be selected from various materials including ammonia, monoamine, alkyl polyamine, polyoxyalkylenepolyamine, and the reaction product of a diprimary amine-terminated material and a material having at least two groups reactive with primary amine, wherein the number of primary amine groups in the reaction mixture was greater than the number of groups reactive with primary amine; and v is the ratio of primary amine nitrogen atoms to boron atoms in the complex, which, preferably, is a ratio of about 1:1.

A 1,4-dioxo-2-butene-functional material broadly refers to a material that

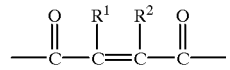

includes at least one functional group having the structure such as may be represented by compounds having the structure

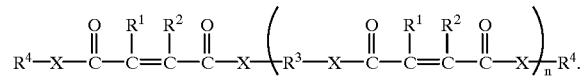

In these structures $R^1$ and $R^2$ may independently cooperate to form a cycloalkyl group or may be independently selected from the group consisting of hydrogen, alkyl groups, aryl groups, alkylaryl groups, and halogen. $R^3$ is a divalent organic linking group; $R^4$ is a monovalent organic radical other than hydrogen; X is selected from the group consisting of oxygen, substituted amino (ie., N—H or N—$R^4$), and sulfur; and n is the number of repeating units encompassed by the parentheses.

More preferably, $R^1$ and $R^2$ are independently selected from hydrogen and lower alkyl groups, $R^3$ is independently a divalent alkylene group or a divalent arylene group, $R^4$ is a monovalent alkyl, aryl or alkylaryl group, X is independently oxygen or a substituted amino group, and n is selected such that the 1,4-dioxo-2-butene-functional material has a number average molecular weight of about 10,000 or less. Even more preferred are 1,4-dioxo-2-butene-functional materials in which $R^1$ and $R^2$ are hydrogen or methyl (most preferred are for both to be hydrogen), and n yields a material having a number average molecular weight of about 400 or less (most preferred being n=0).

A wide variety of 1,4-dioxo-2-butene-functional materials may be used including: 1,4-dialkoxy-1,4-dioxo-2-butenes; 1,4-bis(dialkylamino)-1,4-dioxo-2-butenes; 1,4-dialkylmercapto-1,4-dioxo-2-butenes; 1,4-bis(alkylamino)-1,4-dioxo-2-butenes; 1-alkylamino-4-alkoxy-1,4-dioxo-2-butenes; 1-dialkylamino-4-alkoxy-1,4-dioxo-2-butenes; 1-alkylmercapto-4-alkoxy-1,4-dioxo-2-butenes; 1-alkylmercapto-4-alkylamino-1,4-dioxo-2-butenes; 1-alkylmercapto-4-dialkylamino-1,4-dioxo-2-butenes; and combinations of the foregoing. Among those 1,4-dioxo-2-butene-functional materials which are particularly preferred are the 1,4-dialkoxy-1,4-dioxo-2-butenes such as diethyl maleate, dibutyl maleate, dibutyl fumarate, diethylhexyl maleate, and combinations thereof.

The polymerization initiator systems of the invention may further include a compound that is reactive with the amine component of the complex and that can liberate the organoborane for initiating polymerization of acrylic monomer. Useful amine reactive compounds include acid, aldehyde and anhydride. Isocyanates, acid chlorides and sulfonyl chlorides may also be used but are less preferred.

In another aspect, the invention relates to a polymerizable composition comprising organoborane amine complex, 1,4-dioxo-2-butene-functional material, amine reactive compound, and polymerizable acrylic monomer. The polymerizable acrylic monomer is preferably a monofunctional acrylate ester or a monofunctional methacrylate ester (including substituted derivatives and blends of these materials).

The polymerizable compositions are particularly useful in providing a 100% reactive, two-part, curable (at room temperature) adhesive composition. One part comprises organoborane amine complex and 1,4-dioxo-2-butene-functional material (preferably as a solution). The other part comprises polymerizable acrylic monomer and amine reactive compound. The amine reactive compound is provided in an amount sufficient to liberate the organoborane for initiating polymerization of the acrylic monomer. The two parts of the adhesive may be readily combined in a convenient, commercially useful, whole number mix ratio of 1:10 or less, more preferably 1:4, 1:3, 1:2 or 1:1, such that they can be easily used with two-part adhesive dispensers.

The solubility of the organoborane amine complex in the 1,4-dioxo-2-butene-functional material enables the provision of a two-part adhesive. The complex can be separated from other constituents with which it may react. This can improve the storage stability of the adhesive composition and the compositions of the invention have an extended shelf-life. That is, they remain stable at both room temperature and elevated temperatures (e.g., greater than about 150° F.) for an extended period of time. Special storage conditions such as refrigeration are not required.

The compositions of the invention have excellent adhesion to low surface energy substrates such as polyethylene, polypropylene and polytetrafluoroethylene. Thus, in another aspect, the invention relates to bonded composites comprising a first substrate and a second substrate (preferably low surface energy polymeric materials) adhesively bonded together by a layer of a cured adhesive composition according to the invention. Adhesion to such substrates is promoted by using an effective amount of the organoborane amine complex, which is broadly about 0.003 to 1.5 weight % boron, based on the weight of the entire composition less the weight of fillers, non-reactive diluents, and other non-reactive components in the polymerizable composition. More preferably, the composition contains about 0.008 to 0.5 weight % boron, and most preferably 0.01 to 0.3 weight % boron.

DETAILED DESCRIPTION OF THE PREFERRED EMBODIMENTS

In general, this invention pertains to polymerization initiator systems that are particularly useful in providing two-part curable compositions, especially those that cure (i.e., polymerize) to acrylic adhesives. Broadly, and in one aspect of the invention, the polymerization initiator systems include an organoborane amine complex and a 1,4-dioxo-2-butene-functional material. As explained below, the 1,4-dioxo-2-butene-functional material is advantageously both a carrier (extender) for the organoborane amine complex and reactive with other constituents of the polymerization initiator system. More specifically, the polymerization initiator systems of the invention comprise and, more preferably, consist essentially of organoborane amine complex, 1,4-dioxo-2-butene-functional material, and a material that is reactive with amine for liberating the organoborane.

The organoborane component of the complex initiates free-radical copolymerization of acrylic monomer and 1,4-dioxo-2-butene-functional material to form an acrylic polymer that can be useful as an acrylic adhesive. To stabilize the organoborane against premature oxidation it is complexed with amine. The organoborane is liberated from the complex by reacting the amine portion of the complex with the amine-reactive material. The acrylic adhesives of the invention can bond a wide variety of substrates, but provide exceptionally good adhesion to low surface energy plastic substrates (e.g., polyethylene, polypropylene, polytetrafluoroethylene, etc.) that, heretofore, have been bonded using complex and costly surface preparation techniques.

The 1,4-dioxo-2-butene-functional material enables the provision of an initiator system that is storage stable at room temperature (about 20 to 22° C.) and at elevated temperatures (e.g., greater than about 150° F.). The initiator systems can be directly combined with polymerizable monomers for a two-part adhesive in a convenient, commercially useful, whole number mix ratio of 1:10 or less. Moreover, and quite advantageously, the 1,4-dioxo-2-butene-functional material is reactive with the acrylic monomers and can copolymerize therewith. Thus, in addition to providing a carrier or extender for the organoborane amine complex, the 1,4-dioxo-2-butene-functional material becomes incorporated into the polymerized material. The 1,4-dioxo-2-butene-functional material, amine-reactive material, and acrylic monomer are, individually, reactive materials with number average molecular weights of less than about 10,000, more preferably less than about 1,000, and most preferably less than about 750. As a result, the invention also provides a 100% solids (i.e., fully reactive) polymerizable adhesive composition. The resulting adhesives, in use, remain white or opaque upon exposure to heat or ultraviolet radiation without yellowing or suffering other undesirable discoloration.

Organoborane amine complexes useful in the invention are complexes of organoborane and amine. Thus they provide complex mixtures of the organoborane component and the amine component. The complexes preferably have the following general structure:

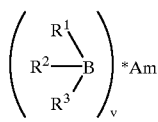

where $R^1$ is an alkyl group having 1 to 10 carbon atoms, and $R^2$ and $R^3$ are independently selected from alkyl groups having 1 to 10 carbon atoms and phenyl-containing groups. More preferably, $R^1$, $R^2$ and $R^3$ are alkyl groups having 1 to 5 carbon atoms such as methyl, ethyl, propyl, iso-propyl, n-butyl, iso-butyl, and pentyl. By "independently selected" it is meant that $R^2$ and $R^3$ may be the same or that they may be different. $R^1$ may be the same as $R^2$ or $R^3$, or it may be different. Preferably $R^1$, $R^2$ and $R^3$ are the same. Most preferred are complexes in which $R^1$, $R^2$ and $R^3$ are each ethyl groups.

The ratio of primary amine nitrogen atoms to boron atoms in the complex is represented by "v" and is preferably selected so as to provide an effective ratio of the primary amine nitrogen atoms and boron atoms. The primary amine nitrogen atom to boron atom ratio in the complex is preferably about 1:1. A primary amine nitrogen atom to boron atom ratio of less than 1:1 could leave free organoborane, a material that tends to be pyrophoric. At primary amine nitrogen atom to boron atom ratios in excess of 1:1, excess primary amine and 1,4-dioxo-2-butene-functional material could react and yield undesired side products.

"Am" represents the amine portion of the complex and may be provided by a wide variety of materials having at least one amine group, including blends of different amines. "Am" may be a polyamine (a material having two or more amine groups such as two to four amine groups).

In one embodiment "Am" may be a primary or secondary monoamine, such as those represented by the structure

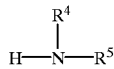

wherein $R^4$ and $R^5$ are independently selected from the group consisting of hydrogen, alkyl groups having 1 to 10 carbon atoms, alkylaryl groups in which the amine group is not directly attached to the aryl structure, and polyoxyalkylene groups. Particular examples of these amines include ammonia, ethylamine, butylamine, hexylamine, octylamine, benzylamine, and polyoxyalkylene monoamines (e.g., JEFFAMINES from Huntsman Chemical Company, such as M715 and M2005).

In another embodiment, the amine may be a polyamine such as those described by the structure $H_2N-R^6-NH_2$ in which $R^6$ is a divalent, organic radical comprised of an alkyl, aryl or alkylaryl group. Preferred among these materials are alkane diamines which may be branched or linear, and having the general structure

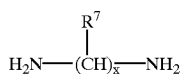

in which x is a whole number greater than or equal to 1, more preferably about 2 to 12, and $R^7$ is hydrogen or an alkyl group. Particularly preferred examples of alkane diamines include 1,2-ethanediamine, 1,3-propanediamine, 1,5-pentanediamine, 1,6-hexanediamine, 1,12-dodecanediamine, 2-methyl-1,5-pentane diamine, 3-methyl-1,5-pentane diamine, and isomers of these materials. While alkane diamines are preferred, other alkyl polyamines may be used such as triethylene tetraamine and diethylene triamine.

Useful polyamines may also be provided by a polyoxyalkylenepolyamine. Polyoxyalkylenepolyamines suitable in making complexes for the invention may be selected from the following structures:

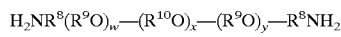

(i.e., polyoxyalkylene diamines); or

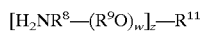

$R^8$, $R^9$ and $R^{10}$ are alkylene groups having 1 to 10 carbon atoms and may be the same or may be different. Preferably, $R^8$ is an alkyl group having 2 to 4 carbon atoms such as ethyl, n-propyl, iso-propyl, n-butyl or iso-butyl. Preferably, $R^9$ and $R^{10}$ are alkyl groups having 2 or 3 carbon atoms such as ethyl, n-propyl or iso-propyl. $R^{11}$ is the residue of a polyol used to prepare the polyoxyalkylenepolyamine (i.e., the organic structure that remains if the hydroxyl groups are removed). $R^{11}$ may be branched or linear, and substituted or unsubstituted (although substituents should not interfere with oxyalkylation reactions).

The value of w is $\geq 1$, more preferably about 1 to 150, and most preferably about 1 to 20. Structures in which w is 2, 3 or 4 are useful too. The value of x and y are both $\geq 0$. The value of z is >2, more preferably 3 or 4 (so as to provide, respectively, polyoxyalkylene triamines and tetraamines). It is preferred that the values of w, x, y and z be chosen such that the resulting complex is a liquid at room temperature ("room temperature" refers to, herein, a temperature of about 20 to 22° C.) as this simplifies handling and mixing thereof. Usually, the polyoxyalkylenepolyamine is itself a liquid. For the polyoxyalkylenepolyainine, molecular weights of less than about 5,000 may be used, although molecular weights of about 1,000 or less are more preferred, and molecular weights of about 140 to 1,000 are most preferred.

Examples of particularly preferred polyoxyalkylenepolyamines include polyethyleneoxidediamine, polypropyleneoxidediamine, polypropyleneoxidetriamine, diethyleneglycoldipropylamine, triethyleneglycoldipropylamine, polytetramethyleneoxidediamine, poly(ethyleneoxide-co-propyleneoxide)diamine, and poly(ethyleneoxide-co-propyleneoxide)triamine.

Examples of suitable commercially available polyoxyalkylenepolyamines include various JEFFAMINES from Huntsman Chemical Company such as the D, ED, and EDR series diamines (e.g., D-400, D-2000, D-5000, ED-600, ED-900, ED-2001, and EDR-148), and the T series triamines (e.g., T-403), as well as DCA-221 from Dixie Chemical Company.

The polyamine may also comprise the condensation reaction product of diprimary amine-terminated material (i.e., the two terminal groups are primary amine) and one or more materials containing at least two groups reactive with primary amine (referred to herein at times as "difunctional primary amine-reactive material"). Such materials are preferably substantially linear so as to have the following general structure $E-(L-E)_u-L-E$ in which each E is the residue of the diprimary amine-terminated material and each L is a linking group that is the residue of the difunctional primary amine-reactive material. (By "residue" is meant those portions of the diprimary amine-terminated material and the difunctional primary amine-reactive material that remain after reaction to form the polyamine adduct.)

The E and L groups are independently selected. That is, each E group may be the same or may be different, as may each L group, although it is preferred that each E group be the same and that each L group be the same. Preferably E and L are selected so as to form a complex that is soluble in acrylic monomer. The majority (more than 50%) of the terminal groups in the polyamine should be primary amine.

The value of u is selected so as to provide both a polyamine and a complex of useful viscosity. Preferably both the polyamine and the complex are liquid at room temperature. Consequently, the value of u may be greater than or equal to zero, although a value of about 0 to 5 is more preferred, and a value of 0 or 1 is most preferred.

The diprimary amine-terminated material may be alkyl diprimary amine, alkylaryl diprimary amine, a polyoxyalkylenediamine (such as those described above), or mixtures thereof Useful alkyl diprimary amines include those having the structure $NH_2—R^{12}—NH_2$ wherein $R^{12}$ is a linear or branched alkyl group having about 1 to 12 carbon atoms such as 1,3-propanediamine, 1,6-hexanediamine, and 1,12-dodecanediamine. Other useful alkyl diprimary amines include triethylene tetraamine and diethylene triamine. An example of a useful alkylaryl diprimary amine is m-tetramethylxylene diamine.

Difunctional primary amine-reactive materials contain at least two groups reactive with primary amine. The reactive groups may be different, but it is preferred that they be the same. Difunctional primary amine-reactive materials having a functionality of 2 (i.e., two groups reactive with primary amine) are preferred. Useful difunctional primary amine-reactive materials may be generally represented by the formula $Y—R^{13}—Z$ wherein $R^{13}$ is a divalent organic radical such as an alkyl, aryl or alkylaryl group or combination thereof, and Y and Z are groups reactive with primary amine and which may be the same or may be different. Examples of useful Y and Z groups reactive with primary amine include carboxylic acid (—COOH), carboxylic acid halide (—COX, where X is a halogen, for example chlorine), ester (—COOR), aldehyde (—CHO), epoxide

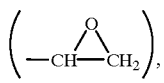

amine alcohol (—NHCH$_2$OH), and acrylic

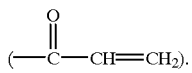

Suitable carboxylic acid-functional materials are preferably those which are useful in forming polyamides, for example, cyclohexane-1,4-dicarboxylic acid and dicarboxylic acids having the structure HOOC—$R^{14}$—COOH in which $R^{14}$ is a linear alkyl group having about 2 to 21 carbon atoms. Aromatic dicarboxylic acids (e.g., terephthalic and isophthalic acids) may be used as can alkylaryl dicarboxylic acids, especially in combination with alkyl dicarboxylic acids.

Useful carboxylic acid halide-functional materials and ester-functional materials include those which are obtained by derivatizing the above-described carboxylic acid-functional materials.

Suitable aldehyde-functional materials include alkyl, aryl and alkylaryl dialdehydes such as oxaldehyde, propanedialdehyde, succinaldehyde, glutaraldehyde, adipaldehyde, 2-hydroxyhexanedial, phthalaldehyde, 1,4-benzenediacetaldehyde, 4,4'-(ethylenedioxy) dibenzaldehyde, and 2,6-naphthalene dicarbaldehyde. Most preferred are glutaraldehyde and adipaldehyde.

Suitable epoxide-functional materials include glycidyl ether diepoxides such as the diepoxides based upon Bisphenol A and Bisphenol F.

Useful acrylic-functional materials are preferably diacrylates and a wide variety of such materials may be successfully employed in the invention.

The organoborane amine complex may be readily prepared using known techniques. Typically, the amine is combined with the organoborane in an inert atmosphere (e.g., a glovebox flushed with nitrogen to an environment having less than 100 ppm oxygen) with slow stirring. The organoborane can be added from a pressure equalizing dropping funnel to a flask into which the amine has been previously weighed. An exotherm is often observed and cooling of the mixture is, therefore, recommended. Addition of the organoborane may be moderated to control the exotherm or in the event of any fuming. If the ingredients have a high vapor pressure, it is desirable to keep the reaction temperature below about 70° to 80° C. Once the materials have been well mixed the complex is permitted to cool to room temperature. No special storage conditions are required although it is preferred that the complex be kept in a capped vessel in a cool, dark location. A crystalline mass of the complex can be heated (e.g., to about 55° C.) with an oil bath and outside of the nitrogen environment to liquify the complex and facilitate its transfer to the storage vial, which can be flushed with nitrogen.

The organoborane amine complex is employed in an effective amount, which is an amount large enough to permit acrylic monomer polymerization to readily occur to obtain an acrylic polymer of high enough molecular weight for the desired end use. If the amount of organoborane amine complex is too low, then the polymerization may be incomplete or, in the case of adhesives, the resulting composition may have poor adhesion. On the other hand, if the amount of organoborane amine complex is too high, then the polymerization may proceed too rapidly to allow for effective mixing and use of the resulting composition.

Large amounts of complex could also lead to the generation of large volumes of borane, which, in the case of an adhesive, could weaken the bond line. The useful rate of polymerization will depend in part on the method of applying the composition to a substrate. Thus, a faster rate of polymerization may be accommodated by using a high speed automated industrial adhesive applicator rather than by applying the composition with a hand applicator or by manually mixing the composition.

Within these parameters, an effective amount of the organoborane amine complex is an amount that preferably provides about 0.003 to 1.5 weight % boron, more preferably about 0.008 to 0.5 weight % boron, most preferably about 0.01 to 0.3 weight % boron. The weight % of boron in a composition is based on the total weight of the composition, less fillers, non-reactive diluents, and other non-reactive materials. Thus, the acrylic group-containing materials, the 1,4-dioxo-2-butene-functional material, and organic thickener, (e.g., poly(methyl methacrylate) or core-shell polymer), if present, are included, but ingredients lacking abstractable hydrogen atoms or unsaturation are not.

The weight % of boron in the composition may be calculated by the following equation:

$$\frac{\text{(weight of complex in the composition)} \times \text{(weight \% of boron in the complex)}}{\text{(Total weight of the composition less non-reactive components)}}$$

Quite advantageously, the organoborane amine complex is carried by (e.g., dissolved in or diluted by) a 1,4-dioxo-2-butene-functional material or a blend of two or more different 1,4-dioxo-2-butene-functional materials. The 1,4-dioxo-2-butene-functional material should not be reactive toward, coordinate or complex the amine portion of the complex and functions as an extender for the complex. The 1,4-dioxo-2-butene-functional material also increases the spontaneous combustion temperature of the curative mixture (organoborane amine complex and 1,4-dioxo-2-butene-functional material).

The 1,4-dioxo-2-butene-functional material should be soluble in acrylic monomers included in the composition. By "soluble" it is meant that no evidence of gross phase separation at room temperature is visible to the unaided eye. Similarly, the organoborane amine complex should be soluble in the 1,4-dioxo-2-butene-functional material, although slightly warming a mixture of the complex and the 1,4-dioxo-2-butene-functional material may be helpful in forming a solution of the two at room temperature. Preferably the 1,4-dioxo-2-butene-functional material is a liquid at or near room temperature (i.e., within about 10° C. of 20–22° C.) or forms a liquid solution with the organoborane amine complex at or near room temperature. Higher viscosity 1,4-dioxo-2-butene materials are also useful. Materials having a Brookfield viscosity of up to about 1,000,000 cp at 22° C. may be successfully employed in the invention, though materials with a viscosity of about 100,000 cp or less are more preferred.

The utility of 1,4-dioxo-2-butene-functional materials as carriers or extenders in the present invention is enhanced by employing materials that show little or no volatility at room temperature (no appreciable or readily measurable change in volume after 6 months storage at room temperature). Such materials generally have a boiling point in excess of about 160° C., more preferably in excess of about 190° C., and most preferably greater than about 210° C.

The 1,4-dioxo-2-butene-functional materials impart excellent storage stability and an extended shelf-life to initiation systems and polymerizable compositions made therewith. That is, the initiator system and polymerizable compositions remain stable at room temperature for an extended period of time. Thus, special storage conditions such as refrigeration can be avoided without substantially sacrificing the storage life of the product.

Quite advantageously, substantial amounts (e.g., more than 75% by weight, up to 100% by weight) of the complex may be dissolved in the 1,4-dioxo-2-butene-functional material, which facilitates the provision of two-part adhesives that can be combined in a commercially useful mix ratio. The 1,4-dioxo-2-butene-functional material also functions as a reactive extender because the ethylenic unsaturation enables this material to free-radically copolymerize with acrylic monomers. Advantageously, this yields a fully (i.e., 100%) reactive system, sometimes referred to herein as a 100% solids system. Desirably, this can reduce the level of low molecular weight migratory components in the polymerizable composition which, in the case of an adhesive, could bloom to the surface of a bonded interface and reduce the strength of the adhesive bond.

A "1,4-dioxo-2-butene-functional material" refers to an organic compound that contains at least one functional group having the general structure

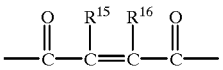

in which $R^{15}$ and $R^{16}$ are monovalent radicals that may be the same or that may be different. In addition, the general structure encompasses both the cis and trans conformations with respect to $R^{15}$ and $R^{16}$.

$R^{15}$ and $R^{16}$ may be independently selected from a broad array of monovalent radicals including hydrogen (H), alkyl groups (preferably those which are lower alkyl, e.g., having from 1 to 4 carbon atoms, and which may be straight chained or branched), aryl groups, alkylaryl groups, and halogen (e.g., bromo, chloro, fluoro and iodo). Additionally, $R^{15}$ and $R^{16}$ may cooperate (i.e., be joined) to form a cycloalkyl group (preferably one having a 5- or 6-membered ring). The various monovalent radicals may be optionally substituted by other moieties, though these are less preferred, especially if they reduce the rate at which the 1,4-dioxo-2-butene-functional material can copolymererize with acrylic monomers.

Preferred among these various compounds are those in which one of $R^{15}$ and $R^{16}$ is H while the other is an alkyl group, more preferably a lower alkyl group (e.g., having from 1 to 4 carbon atoms). Even more preferred are compounds in which one of $R^{15}$ and $R^{16}$ is H while the other is methyl ($CH_3$). Most preferred, however, are compounds in which both $R^{15}$ and $R^{16}$ are H to promote rapid copolymerization with acrylic monomers.

Compounds incorporating the 1,4-dioxo-2-butenyl functional group illustrated above and which can be employed in the invention may be generally represented by the following structure:

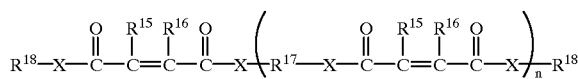

In this structure $R^{15}$ and $R^{16}$ are as described above. $R^{17}$ is a divalent organic linking group that includes both alkylene and arylene groups, and each $R^{18}$ is independently selected from monovalent radicals other than H such as, for example, alkyl, aryl, and alkylaryl groups.

The number of repeating units encompassed by the parentheses is represented by "n," which may vary over a wide range depending upon the desired viscosity characteristics for the 1,4-dioxo-2-butene functional material, as described more fully above. The value of "n" is also related to the molecular weight of the 1,4-dioxo-2-butene functional material and is preferably selected so as to yield a number average molecular weight of about 10,000 or less, more preferably about 400 or less. Most preferably, however, the value of "n" is 0 so as to provide monomeric materials.

Each "X" is independently selected from oxygen (O), substituted amino (N—$R^{19}$) (where $R^{19}$ is a monovalent radical such as hydrogen, an alkyl group or aryl group), or sulfur (S), so as to yield, respectively, ester, amide, and thioester linkages. Particularly preferred are compounds in which each X is oxygen, or in which some X is oxygen and some X is substituted amino (yielding ester amide linkages).

Broad classes of useful 1,4-dioxo-2-butene functional materials include:

1,4-dialkoxy-1,4-dioxo-2-butenes; 1,4-bis(dialkylamino)-1,4-dioxo-2-butenes; 1,4-dialkylmercapto-1,4-dioxo-2-butenes; 1,4-bis(alkylamino)-1,4-dioxo-2-butenes; 1-alkylamino-4-alkoxy-1,4-dioxo-2-butenes; 1-dialkylamino-4-alkoxy-1,4-dioxo-2-butenes; 1-alkylmercapto-4-alkoxy-1,4-dioxo-2-butenes, 1-alkylmercapto-4-alkylamino-1,4-dioxo-2-butenes; 1-alkylmercapto-4-dialkylamino-1,4-dioxo-2-butenes; and combinations of the foregoing. It will be understood that these broad classes of materials include both monomeric and polymeric compounds. Of these, the: 1,4-dialkoxy-1,4-dioxo-2-butenes; 1,4-bis (dialkylamino)-1,4-dioxo-2-butenes; and 1,4-bis (alkylamino)- 1,4-dioxo-2-butenes; 1-alkylamino-4-alkoxy- 1,4-dioxo-2-butenes; 1-dialkylamino-4-alkyloxy- 1,4-dioxo-2-butenes; and combinations thereof are the most preferred.

Specific examples of useful 1,4-dioxo-2-butene functional materials include: diethyl maleate, dibutyl maleate, dibutyl fumarate, diethylhexyl maleate, and combinations thereof Examples of commercially available 1,4-dioxo-2-butene functional materials that may be used in the practice of the invention include STAFLEX DEM and STAFLEX DBM each available from C.P. Hall Co. (Chicago, Ill.).

The 1,4-dioxo-2-butene-functional material is used in an effective amount that does not materially, adversely affect the ultimate properties of the polymerized composition (for example, adhesion), depending on the intended use. Generally, this is an amount of not more than about 50%, preferably not more than about 25%, more preferably not more than about 10%, and most preferably not more than about 5%, based on the total weight of the composition.

As noted above, the organoborane amine complexes of the invention are especially useful as polymerization initiators, in particular, for initiating the polymerization of acrylic monomers. In such cases, the organoborane amine complexes form one component of a polymerization initiator system that comprises and, more preferably, consists essentially of an effective amount of the organoborane amine complex and an effective amount of a compound that is reactive with amine for liberating organoborane so as to initiate polymerization.

The amine reactive compound liberates organoborane by reacting with the amine, thereby removing the organoborane from chemical attachment with the amine. A wide variety of materials may be used to provide the amine reactive compound including combinations of different materials. Desirable amine reactive compounds are those materials that can readily form reaction products with amines at or below (and, more preferably, at) room temperature (about 20° to 22° C.) so as to provide a composition such as an adhesive that can be easily used and cured under ambient conditions. General classes of useful amine reactive compounds include acids, anhydrides and aldehydes. Isocyanate, acid chloride, sulfonyl chloride, and the like such as isophorone diisoyanate, toluene diisocyanate and methacryloyl chloride may also be used but are less preferred because they require scrupulous drying of monomer mixtures containing these ingredients so as to preclude undesirable, premature reaction with moisture.

Acids are a preferred amine reactive compound. Any acid that can liberate the organoborane by salting the amine group may be employed. Useful acids include Lewis acids (e.g., $SnCl_4$, $TiCl_4$ and the like) and Bronsted acids (e.g., carboxylic acids, HCl, $H_2SO_4$, $H_3PO_4$, phosphonic acid, phosphinic acid, silicic acid, and the like). Useful carboxylic acids include those having the general formula $R^{20}$—COOH, where $R^{20}$ is hydrogen, an alkenyl group of 1 to 8 and preferably 1 to 4 carbon atoms, or an aryl group of 6 to 10, preferably 6 to 8 carbon atoms. The alkenyl groups may comprise a straight chain or they may be branched. They may be saturated or unsaturated. The aryl groups may contain substituents such as alkyl, alkoxy or halogen moieties. Illustrative acids of this type include acrylic acid, methacrylic acid, acetic acid, benzoic acid, and p-methoxybenzoic acid.

If it is desirable to provide a polymerizable composition that has less odor, an alkenyl group having a larger number of carbon atoms is recommended. In this event, $R^{20}$ may be a straight or branched chain, saturated or unsaturated alkenyl group of at least 9 carbon atoms, more preferably at least about 11 carbon atoms, and most preferably at least about 15 carbon atoms.

Other carboxylic acids useful as the amine reactive compound include dicarboxylic acids and carboxylic acid esters. Such compounds may be represented by the following general structure:

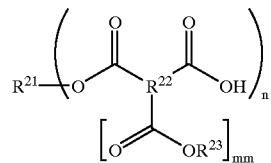

$R^{21}$ is hydrogen, a monovalent organic group (preferably having about 18 atoms or less, more preferably about 8 atoms or less, excluding hydrogen), or a multivalent organic group (preferably having about 30 atoms or less, more preferably about 10 atoms or less, excluding hydrogen). $R^{22}$ is multi-valent organic group (preferably having about 8 atoms or less, more preferably about 4 atoms or less, excluding hydrogen). $R^{23}$ is hydrogen or a monovalent organic group (preferably having about 18 atoms or less, more preferably about 8 atoms or less, excluding hydrogen). The integral value of "m" is 0, 1 or 2, and the integral value of "n" is greater than or equal to one, preferably 1 to 4, more preferably 1 or 2.

More preferably m is 0 so as to yield carboxylic acids represented by the following general structure:

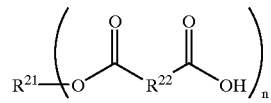

wherein $R^{21}$, $R^{22}$, and n are as previously defined.

The "organic groups" referred to in conjunction with $R^{21}$, $R^{22}$ and $R^{23}$ may be an aliphatic group (which may be saturated or unsaturated, and linear or branched), a cycloaliphatic group, an aromatic group, or an oxygen-, nitrogen-, or sulfur-containing heterocyclic group. When $R^{21}$ is hydrogen, m is zero, and n is one, the resulting compounds are dicarboxylic acids, useful examples of which include: oxalic acid; malonic acid; succinic acid; glutaric acid; adipic acid; maleic acid; fumaric acid; phthalic acid; isophthalic acid; and terephthalic acid. When, $R^{21}$ is an aliphatic group, n is one, and m is zero, the resulting compounds are carboxylic acid esters, useful examples of which include: 1,2-ethylene bismaleate; 1,2-propylene bismaleate; 2,2'-diethyleneglycol bismaleate; 2,2'-dipropyleneglycol bismaleate; and trimethylolpropane trismaleate.

Also preferred as the amine reactive compound are materials having at least one anhydride group, such materials preferably having one of the following structures:

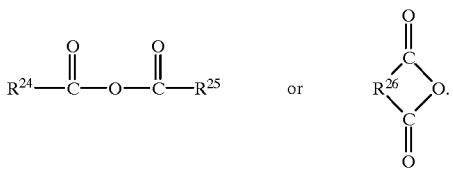

$R^{24}$ and $R^{25}$ are organic radicals which independently may be aliphatic (including straight- and branched-chain arrangements that may be saturated or unsaturated), cycloaliphatic, or aromatic. Preferred aliphatic groups comprise 1 to 17 carbon atoms, more preferably 2 to 9 carbon atoms. Preferred aromatic groups include benzene which may be substituted with 1 to 4 carbon atom aliphatic groups.

$R^{26}$ is a divalent organic radical that completes a cyclic structure with the anhydride group to form, for example, a 5- or 6-membered ring. $R^{26}$ may be substituted with aliphatic, cycloaliphatic or aromatic groups, preferably aliphatic groups comprising 1 to 12, more preferably 1 to 4 carbon atoms. $R^{26}$ may also contain heteroatoms such as oxygen or nitrogen provided that any heteroatom is not adjacent to the anhydride functionality. $R^{26}$ may also be part of a cycloaliphatic or aromatic fused ring structure, either of which may be optionally substituted with aliphatic groups. The presence of a free-radically polymerizable group in the anhydride-functional amine reactive compound may permit the same to polymerize with the acrylic monomers.

Aldehydes useful as the amine-reactive compound have the formula: $R^{27}$—$(CHO)_x$ where $R^{27}$ is a monovalent organic radical, such as is an alkyl group of 1 to 10 carbon atoms (preferably 1 to 4), or an aryl group having 6 to 10 carbon atoms (preferably 6 to 8), and x is 1 or 2 (preferably 1). In this formula, the alkyl groups may be straight or branch-chained, and may contain substituents such as halogen, hydroxy and alkoxy. The aryl groups may contain substituents such as halogen, hydroxy, alkoxy, alkyl and nitro. The preferred $R^{27}$ group is aryl. Illustrative examples of compounds of this type include, benzaldehyde, o-, m- and p-nitrobenzaldehyde, 2,4-dichlorobenzaldehyde, p-tolylaldehyde and 3-methoxy-4 hydroxybenzaldehyde. Blocked aldehydes such as acetals may also be used in this invention.

The amine reactive compound is employed in an effective amount; that is, an amount effective to promote polymerization by liberating organoborane from the complex, but without materially adversely affecting the properties of the ultimate polymerized composition. Larger amounts of amine reactive compound may permit the polymerization to proceed too quickly and, in the case of adhesives, the resulting materials may demonstrate inadequate adhesion to low energy surfaces. Undesirable side reactions that adversely affect the performance properties of the polymerized composition, or that yield an undesirably high level of extractables in the polymerized composition may also result from using large amounts of amine reactive compound. On the other hand, an excess of certain amine reactive compounds may promote adhesion to higher energy surfaces. If small amounts of amine reactive compound are employed, the rate of polymerization may be too slow and the monomers that are being polymerized may not adequately increase in molecular weight. However, a reduced amount of amine reactive compound may be helpful in slowing the rate of polymerization if it is otherwise too fast.

Within these parameters, the amine reactive compound may be provided in an amount wherein the number of equivalents of amine reactive groups is as much as twice stoichiometric with the number of amine groups in the organoborane amine complex, a ratio of 0.4:1 to 2:1 (amine reactive group equivalents to amine group equivalents) being particularly preferred. However, it is much more preferred that the number of equivalents of amine reactive groups not exceed the number of equivalents of amine groups in the organoborane amine complex, with a ratio of 0.5:1 to 1:1 being most preferred.

The organoborane amine complex initiator systems of the invention are especially useful in polymerizing acrylic monomers, particularly for making polymerizable adhesives. By "acrylic monomer" is meant polymerizable monomers having one or more acrylic or substituted acrylic moieties, chemical groups or functionality; that is, groups having the general structure

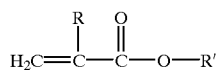

wherein R is hydrogen or an organic radical and R' is an organic radical. Where R and R' are organic radicals, they may be the same or they may be different. Blends of acrylic monomers may also be used. The polymerizable acrylic monomer may be monofunctional, polyfunctional or a combination thereof.

The most useful monomers are monofunctional (meth) acrylate esters and substituted derivatives thereof, such as amide, cyano, chloro, and silane derivatives, as well as blends of substituted and unsubstituted monofunctional (meth)acrylate esters. (The parenthetical expression "(meth)" indicates that methyl substitution is optional.) Particularly preferred monomers include lower molecular weight methacrylate esters such as methyl methacrylate, ethyl methacrylate, methoxyethyl methacrylate, cyclohexyl methacrylate, tetrahydrofurfuryl methacrylate, and blends thereof.

Multifunctional polymerizable acrylic monomers are especially useful in small amounts (preferably less than about 20% based on the weight of polymerizable monomer mixture, more preferably less than about 10% by weight, most preferably less than about 5% by weight) as modifiers for improving the creep resistance, temperature resistance or solvent resistance of the ultimate composition. One class of multifunctional polymerizable acrylic monomers useful as modifying monomers corresponds to the general formula:

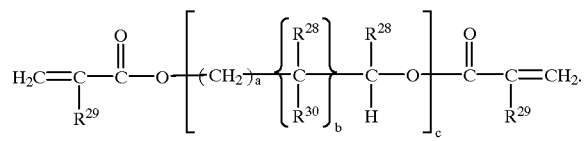

$R^{28}$ may be selected from the group consisting of hydrogen methyl, ethyl, and

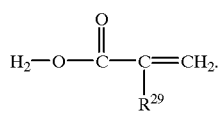

$R^{29}$ may be selected from the group consisting of hydrogen, chlorine, methyl and ethyl. $R^{30}$ may be selected from the group consisting of hydrogen, and

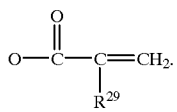

The value of "a" is an integer greater than or equal to 1, more preferably, from 1 to about 8, and most preferably from 1 to 4. The integral value of "b" is greater than or equal to 1, more preferably, from 1 to about 20. The value of "c" is 0 or 1.

A second class of multifunctional polymerziable acrylic monomers useful as modifying monomers include ethylene glycol dimethacrylate, ethylene glycol diacrylate, polyethylene glycol diacrylate, tetraethylene glycol dimethacrylate, diglycerol diacrylate, diethylene glycol dimethacrylate, pentaerythritol triacrylate, trimethylolpropane trimethacrylate, as well as other polyether diacrylates and dimethacrylates.

A third class of multifunctional polymerizable acrylic monomers that are useful in the invention as modifying monomers, have the general formula:

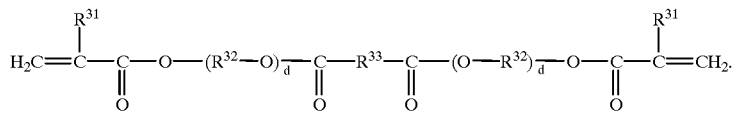

$R^{31}$ may be hydrogen, chlorine, methyl or ethyl; $R^{32}$ may be an alkylene group with 2 to 6 carbon atoms; and $R^{33}$ is $(CH_2)_e$ in which e is an integer of 0 to 8, or one of the following:

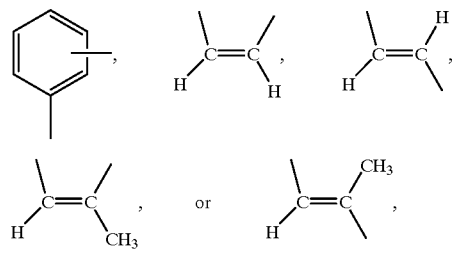

the phenyl group being substitutable at any one of the ortho, meta or para positions. The value of "d" is an integer of 1 to 4.

Typical monomers of this class include dimethacrylate of bis(ethylene glycol) adipate, dimethacrylate of bis(ethylene glycol) maleate, dimethacrylate of bis(ethylene glycol) phthalate, dimethacrylate of bis(tetraethylene glycol) phthalate, dimethacrylate of bis(tetraethylene glycol) sebacate, dimethacrylates of bis(tetraethylene glycol) maleate, and the diacrylates and chloroacrylates corresponding to the dimethacrylates, and the like.

Another useful class of multifunctional polymerizable acrylic monomer modifying agents are isocyanate-hydroxyacrylate or isocyanate-aminoacrylate reaction products. These may be characterized as acrylate terminated polyurethanes and polyureides or polyureas. Such monomers have the following general formula:

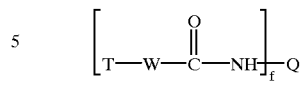

where W is selected from the group consisting of O and N—$R^{34}$ is selected from the group consisting of hydrogen and lower alkyl groups (e.g., 1 to 7 carbon atoms). T is the organic residue of an active hydrogen-containing acrylic ester, the active hydrogen having been removed and the ester being hydroxy or amino substituted on the alkyl portion thereof(including the methyl, ethyl and chlorine homologs). The integral value of "f" is from 1 to 6. Q is a mono- or polyvalent organic radical selected from the group consisting of alkyl, alkylene, alkenyl, cycloalkyl, cycloalkylene, aryl, aralkyl, alkaryl, poly(oxyalkylene), poly(carboalkoxyalkylene), and heterocyclic radicals, both substituted and unsubstituted.

Typical monomers of this class include the reaction product of mono- or polyisocyanates, for example, toluene diisocyanate, with an acrylate ester containing a hydroxy or an amino group in the non-acrylate portion thereof, for example, hydroxyethyl methacrylate.

Certain acrylic monomer combinations have been found to be particularly advantageous in providing polymerizable compositions having less odor. Such monomer combinations preferably comprise about 10 to 90 wt. % tetrahydrofurfuryl methacrylate; 25 to 70 wt. % of one or more monomers selected from the group consisting of 2-ethoxyethyl methacrylate, n-hexyl acrylate, cyclohexyl methacrylate, isooctyl acrylate, 2-ethylhexyl acrylate, 2-ethylhexyl methacrylate, and isobornyl acrylate; and 0 to 65 wt. % of one or more monomers selected from the group consisting of isobutyl methacrylate, n-butyl methacrylate, cyclohexyl acrylate, n-hexyl methacrylate, isobornyl methacrylate, and isodecyl methacrylate; wherein the respective weight percentages (wt. %) are based on the total weight of the mononer blend.

The compositions of the invention may further comprise a variety of optional additives. One particularly useful additive is a thickener such as medium (about 100,000) molecular weight polymethyl methacrylate which may be incorporated in an amount of about 10 to 40 weight %, based on the total weight of the composition. Thickeners may be employed to increase the viscosity of the composition to a more easily room temperature applied viscous syrup-like consistency.

Another particularly useful additive is an elastomeric material. These materials can improve the fracture toughness of compositions made therewith which can be beneficial when, for example, bonding stiff, high yield strength materials such as metal substrates that do not mechanically absorb energy as easily as other materials, such as flexible polymeric substrates. Such additives can be incorporated in an amount of about 5% to 35% by weight, based on the total weight of the composition.

Certain graft copolymer resins such as particles that comprise rubber or rubber-like cores or networks that are surrounded by relatively hard shells, these materials often being referred to as "core-shell" polymers, are particularly useful elastomeric additives. Most preferred are the acrylonitrile-butadiene-styrene graft copolymers. In addition to improving the fracture toughness of the composition, core-shell polymers can also impart enhanced spreading and flow properties to the uncured composition. These enhanced properties may be manifested by a reduced tendency for the composition to leave an undesirable "string" upon dispensing from a syringe-type applicator, or sag or slump after having been applied to a vertical surface. Use of more than about 10% of a core-shell polymer additive is desirable for achieving improved sag-slump resistance.

Another useful adjuvant is an acrylic monomer crosslinking agent. Acrylic monomer crosslinking agents can be used to enhance the solvent resistance of the adhesive bond, although certain compositions of the invention have good solvent resistance even in the absence of externally added acrylic monomer crosslinking agents. Acrylic monomer crosslinking agents are typically employed in an amount of about 0.2 to 10 weight % based on the total weight of the composition, and those which are useful include the various diacrylates and dimethacrylates referred to above as possible acrylic modifying monomers as well as other materials. Particular examples of suitable acrylic monomer crosslinking agents include ethylene glycol dimethacrylate, ethylene glycol diacrylate, triethyleneglycol dimethacrylate, diethylene glycol bismethacryloxy carbonate, polyethylene glycol diacrylate, tetraethylene glycol dimethacrylate, diglycerol diacrylate, diethylene glycol dimethacrylate, pentaerythritol triacrylate, trimethylolpropane trimethacrylate, as well as other polyether diacrylates and dimethacrylates.

Small amounts of inhibitors such as hydroquinone may be used, for example, to prevent or reduce degradation of the acrylic monomers during storage. Inhibitors may be added in an amount that does not materially reduce the rate of polymerization or the ultimate properties of an adhesive or other composition made therewith, typically about 100–10,000 ppm based on the weight of the polymerizable monomers. Other possible additives include non-reactive colorants, fillers (e.g., carbon black), etc.

The various optional additives are employed in an amount that does not significantly adversely affect the polymerization process or the desired properties of compositions made therewith.

Polymerizable compositions according to the invention may be used in a wide variety of ways, including as sealants, coatings, and injection molding resins. They may also be used as matrix resins in conjunction with glass and metal fiber mats such as in resin transfer molding operations. They may further be used as encapsulants and potting compounds such as in the manufacture of electrical components, printed circuit boards and the like. Quite desirably, they provide polymerizable adhesive compositions that can bond a diverse myriad of substrates, including polymers, wood, ceramics, concrete, and primed metals.

Polymerizable compositions of the invention are especially useful for adhesively bonding low surface energy plastic or polymeric substrates that historically have been very difficult to bond without using complicated surface preparation techniques, priming, etc. By low surface energy substrates is meant materials that have a surface energy of less than 45 mJ/m$^2$, more typically less than 40 mJ/m$^2$ or less than 35 mJ/m$^2$. Included among such materials are polyethylene, polypropylene, acrylonitrile-butadiene-styrene, and fluorinated polymers such as polytetrafluoroethylene (TEFLON) which has a surface energy of less than 20 mJ/m$^2$. (The expression "surface energy" is often used synonymously with "critical wetting tension" by others.) Other polymers of somewhat higher surface energy that may be usefully bonded with the compositions of the invention include polycarbonate, polymethylmethacrylate, and polyvinylchloride.

The polymerizable compositions of the invention can be easily used as two-part adhesives. The acrylic monomers are blended as would normally be done when working with such materials. The amine-reactive compound is usually included in this blend so as to separate it from the organoborane amine complex, thus providing one part of the two-part composition. The organoborane amine complex and 1,4-dioxo-2-butene-functional material provide the second part of the composition. The first and second parts are combined shortly before it is desired to use the composition.

For a two-part adhesive such as those of the invention to be most easily used in commercial and industrial environments, the ratio at which the two parts are combined should be a convenient whole number. This facilitates application of the adhesive with conventional, commercially available dispensers. Such dispensers are shown in U.S. Pat. Nos. 4,538,920 and 5,082,147 and are available from ConProTec, Inc. (Salem N.H.) under the tradename "Mixpac" and are sometimes described as dual syringe-type applicators.

Typically, these dispensers use a pair of tubular receptacles arranged side-by-side with each tube being intended to receive one of the two parts of the adhesive. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended adhesive is extruded from the mixing chamber onto a substrate. Once the tubes have been emptied, they can be replaced with fresh tubes and the application process continued.

The ratio at which the two parts of the adhesive are combined is controlled by the diameter of the tubes. (Each plunger is sized to be received within a tube of fixed diameter, and the plungers are advanced into the tubes at the same speed.) A single dispenser is often intended for use with a variety of different two-part adhesives and the plungers are sized to deliver the two parts of the adhesive at a convenient mix ratio. Some common mix ratios are 1:1, 1:2, 1:4 and 1:10.

If the two parts of the adhesive are combined in an odd mix ratio (e.g. 3.5:100), then the ultimate user would probably manually weigh the two parts of the adhesive. Thus, for best commercial and industrial utility and for ease of use with currently available dispensing equipment, the two parts of the adhesive should be capable of being combined in a common, whole number mix ratio such as 10:1 or less, more preferably 1:4, 1:3, 1:2 or 1:1.

Adhesive compositions of the invention are uniquely suited for use with conventional, commercially available dispensing equipment for two-part adhesives. The solubility of the organoborane amine complex in the 1,4-dioxo-2-butene-functional material can be advantageously used to modify the mix ratio of the two parts of the adhesive composition to the most commercially important whole numbervalues; e.g., 1:10, 1:4, 1:3, 1:2 or 1:1.

Once the two parts have been combined, the composition should be used quickly, as the useful pot life may be short depending upon the acrylic monomer mix, the amount of complex, the temperature at which the bonding is to be performed, and the presence or absence of crosslinking agents.

The polymerizable composition can be easily applied and cured at room temperature. Typically, it is applied to one or both substrates and then the substrates are joined together with pressure to force excess composition out of the bond line. This also has the advantage of displacing composition that has been exposed to air and that may have begun to oxidize. In general, the bonds should be made shortly after the composition has been applied, preferably within about 60 minutes. The typical bond line thickness is about 0.1 to 0.3 mm. The bonding process can easily be carried out at room temperature.

The bonds preferably cure to a reasonable green strength to permit handling of the bonded components within about 2 hours. Full strength will preferably be reached in about 6 to 7 hours under ambient conditions; post-curing with heat (typically about 80° C.) may be used if desired. Even more rapid strength build-up is facilitated by the inclusion of crosslinking agents or cyclic anhydride-functional or vinyl unsaturated anhydride-functional amine reactive compounds in the polymerizing mixture.

The invention will be more fully appreciated with reference to the following nonlimiting examples in which dimensions in English units are nominal and conversion to metric units is approximate.

Various tradenames and abbreviations used in the examples are defined according to the following schedule:

| Abbreviation or Tradename | Description |
| --- | --- |
| Cm | Centimeter |
| HDPE | High density polyethylene |
| g | Gram |
| Kg | Kilogram |
| Lb(s). | Pound(s) |
| LDPE | Low density polyethylene |
| Min. | Minute |
| μm | Micron |
| Mm | Millimeter |
| Montell 186A | Modified polypropylene commercially available from Montell, USA Incorporated, Wilmington, DE. |
| MPa | MegaPascals |
| N/cm | Newtons per centimeter |
| PP | Polypropylene |
| Psi | Pounds per square inch |
| Piw | Pounds per inch width |

EXAMPLE 1

Preparation of Initiator Mixtures

More specific details about the initiator mixtures used in the examples are given in Table 1 below. In general, however, the initiator mixtures were obtained by preparing a slurry of a 1,4-dioxo-2-butene-functional material and an additive (e.g., a poly(methyl methacrylate) or polyester thickener) and agitating the same at 70° C. for about 30 minutes until a clear, colorless solution was obtained. The resultant mixture was allowed to cool to room temperature. If, instead, the mixture contained a core shell rubber modifier as an additive, it was allowed to stand at 70° C. for 18 hours to swell the additive, and was then sheared aggressively with a saw-toothed blade of a laboratory scale dispersator, commercially available from Premier Mill Corporation, Reading, Pa. until a homogeneous, lump-free mixture was obtained. A complex of triethylborane and 1,6-hexanediamine (2:1 molar ratio, respectively) was then added to and dissolved in the resulting mixture with heat (about 50° C.) and stirring for about 10 minutes until the crystals of complex dissolved.

TABLE 1

| Initiator Mixture | 1,4-dioxo-2-butene Functional Material | | Additive | | Amount of Complex (g) |
| --- | --- | --- | --- | --- | --- |
| | Type | Amount (g) | Type | Amount (g) | |
| I-1 | Dibutyl maleate[1] | 15.60 | Rubber modifier[3] | 8.40 | 6.00 |
| I-2 | Diethyl maleate[2] | 11.32 | Thickener[4] | 5.55 | 4.22 |
| I-3 | Dibutyl maleate[1] | 4.49 | Thickener[5] | 10.48 | 3.74 |
| I-4 | Dibutyl maleate[1] | 7.31 | Rubber modifier[3] | 3.42 | 1.19 |
| I-5 | Diethyl maleate[2] | 5.58 | Thickener[4] | 2.52 | 0.90 |
| I-6 | Dibutyl maleate[1] | 4.05 | Thickener[5] | 9.45 | 1.50 |
| I-7 | Dibutyl maleate[1] | 12.90 | Rubber modifier[3] | 8.10 | 9.00 |
| I-8 | Diethyl maleate[2] | 13.86 | Thickener[4] | 7.14 | 9.00 |
| I-9 | Dibutyl maleate[1] | 6.30 | Thickener[5] | 14.70 | 9.00 |
| I-10 | Male(am ide)ester | 6.98 | None | — | 3.02 |

[1]STAFLEX DBM, commercially available from C. P. Hall Co, Chicago, IL.
[2]STAFLEX DEM, commercially available from C. P. Hall Co, Chicago, IL.
[3]Blendex ™360 core-shell rubber modifier from General Electric Specialty Chemicals, Parkersbury, WV.
[4]Medium molecular weight poly(methyl methacrylate), ELVACITE 2010, commercially available from ICI Acrylics, Wilmington, DE.
[5]Unsaturated polyester, commercially available from McWhorter Technologies, Carpentersville, IL, as 711-9620 sans styrene.

The male(amide)ester employed in Initiator Mixture I-10 was prepared as follows: 2.413 grams of anhydrous 2-propanol (commercially available from Aldrich Chemical Co., Milwaukee, Wis.) was combined with 0.056 gram of dibutyltin diacetate (commercially available from Air Products Co., Allentown, Pa.) and mixed for approximately 5 minutes. 6.405 grams of tert-butylisomaleimide was then added and mixed for four days under ambient conditions.

The tert-butylisomaleimide was synthesized as follows. To a 12L four necked round bottom flask fitted with a mechanical stirrer, a thermometer and an addition funnel was added, under nitrogen, 1072.6 grams of maleic anhydride and 6062 grams of acetonitrile. The mixture was stirred to dissolve the solids and cooled to −7° C. To this was slowly added 800 grams of t-butylamine at a rate such that the temperature remained below 0° C. (approximately 2.5 hour addition). Following this addition the mixture was stirred at −7° C. for one hour and then overnight at room temperature. The solid was collected by filtration, washed with 500 mLs of acetonitrile, and dried to give 1355 grams of(Z)-4-(tert-butylamino)-4-oxo-2-butenoic acid as a white solid. Each of the raw materials is commercially available from Aldrich Chemical Co., Milwaukee, Wis.

EXAMPLE 2

Preparation of Polymerizable Monomer Mixtures

A masterbatch comprising polymerizable acrylic monomer, core-shell rubber modifier, and internal spacers was prepared. More specifically, a slurry comprising 138.00 g Blendex™ 360 core-shell rubber modifier (General Electric Specialty Chemicals, Parkersburg, W.Va.), 324.00 g tetrahydrofurfuryl methacrylate (commercially available from Aldrich Chemical Co, Milwaukee, Wis.), and 108.00 g 2-ethylhexyl methacrylate (commercially available from Aldrich Chemical Co., Milwaukee, Wis.) was prepared and allowed to stand at 70° C. for 4 hours until the core shell rubber modifier had become swollen and translucent. The resultant, opaque dispersion was allowed to cool to room temperature and sheared aggressively with a saw-toothed blade of a laboratory scale dispersator, commercially available from Premier Mill Corporation, Reading, Pa. until a homogeneous, lump-free mixture was obtained. Then ceramic microspheres (38.50 grams, 100×350 µm diameter, commercially available under the trade designation of Z-LIGHT W-1600 from Zeelan Industries Inc., St. Paul, Minn.) were added to the dispersion and mixed well.

As shown in Table 2, a portion of the masterbatch was combined with different amine-reactive compounds to yield a polymerizable monomer mixture.

TABLE 2

| Polymerizable Monomer Mixture | Masterbatch Amount (g) | Amine-Reactive Compound Type | Amount (g) |
| --- | --- | --- | --- |
| M-1 | 49.75 | Methacrylic acid anhydride[1] | 0.25 |
| M-2 | 49.46 | Succinic acid anhydride[1] 2-methacryloyloxyethyl succinate monoester[2] | 0.05 0.49 |
| M-3 | 49.79 | Glutaric acid[1] | 0.21 |
| M-4 | 49.27 | 2-ethylhexyl maleate monoester[3] | 0.73 |

[1]Commercially available from Aldrich Chemicai Co., Milwaukee, WI.
[2]Commercially available as NK Ester SA from Shin Nakamura, Wakayama City, Japan.
[3]Commercially available from Monomer, Polymer, Dajac, Southhampton, PA.

A fifth polymerizable monomer mixture, designated M5, was prepared as described in conjunction with polymerizable monomer mixtures M1–M4 except that the slurry contained 201.52 g Blendex™ 360 core-shell rubber modifier and 443.52 g tetrahydrofurfuryl methacrylate but not 2-ethylhexyl methacrylate. The slurry was allowed to stand at 65° C. for 17 hours. The opaque dispersion that resulted was aggressively sheared as described for polymerizable monomer mixtures M1–M4, after which 147.84 g 2-ethylhexyl methacrylate and 40.48 g ceramic microspheres were added and mixed well. A 47.94 g portion of the dispersion was combined with 2.06 g 2-acryloyloxyethyl maleate (commercially available from Rhom Tech or Hüls, Somerset, N.J.).

EXAMPLES 3 to 23

Preparation and Testing of Two-Part Acrylic Adhesive Compositions

Preparation of Adhesive Compositions

The polymerizable monomer mixtures and initiator mixtures described in Examples 1 and 2 were packaged in a MIXPAC SYSTEM 50 10:1 volume ratio dual syringe applicator (Kit No. MP-050-10-09, commercially available from ConProTec, Salem, N.H.), the larger diameter syringe holding the polymerizable monomer mixture part and the smaller diameter syringe holding the initiator mixture part. The two parts were combined by simultaneous extrusion through a 4 inch (10 cm long), 17-stage static mixing nozzle (Part No. MX 4-0-17-5, commercially available from ConProTec, Salem, N.H.). The different two-part acrylic adhesive compositions are described more fully below in Table 3.

The adhesive compositions were then evaluated for overlap shear bond strength, peel bond strength and worklife using the test methods described below and with the results presented in Table 3.

Overlap Shear Bond Strength Test Method

Adhesive composition was applied directly onto an untreated 1 inch×4 inch×⅛ inch (2.5 cm×10 cm×0.3 cm thick) test panel. A second untreated test panel of the same material (but having no adhesive composition) was immediately placed against the adhesive composition on the first test panel so as to form an overlap area nominally measuring 0.5 inch×1 inch (1.3 cm×2.5 cm). A clamp was applied to the overlap area to fixture the bond. The test panels were either high-density polyethylene (HDPE) or polypropylene (PP), both commercially available from Cadillac Plastics Company, Minneapolis, Minn. or modified polypropylene (Montell 186A), commercially available from Montell, USA Incorporated, Wilmington, Del. A small amount of bonding composition squeezed out of the overlap area when the bonded composite was fixtured and this was allowed to remain.

The bonds were allowed to cure for at least 96 hours at room temperature (about 20° to 22° C.). The clamps were then removed, and the overlap bonds were tested to failure in shear mode on a tensile testing machine operating at a crosshead speed of 0.5 inch/minute (1.27 cm/minute). The tests were carried out at room temperature. The overlap shear values were recorded in pounds and then converted into pounds per square inch (psi) to the nearest whole number and megaPascals (MPa) to two places after the decimal point. The reported overlap shear values are an average of 3 measurements.

Preferably, the overlap shear values were at least about 500 psi (3.45 MPa), more preferably at least about 700 psi (4.83 MPa) for the HDPE; at least about 600 psi (4.14 MPa), more preferably at least about 800 psi (5.52 MPa) for the PP; and at least about 200 psi (1.38 MPa), more preferably at least about 300 psi (2.07 MPa) for the Montel 186A. More preferably, a polymerizable composition was able to bond each of HDPE, PP, and Montell 186A to these levels.

Peel Bond Strength Test Method

The adhesive compositions were tested on two different polyolefin film substrates: 30 mil (0.8 mm) thick high-density polyethylene (HDPE) and 30 mil (0.8 mm) thick low-density polyethylene (LDPE), both commercially available from Cadillac Plastics Company, Minneapolis, Minn. Neither of the films had been surface treated.

Adhesive composition was applied to a 2 inch (5.1 cm) wide×6 inch (15.2 cm) long section of polyolefin film, and a second film comprising the same material was eased onto the adhesive composition using a 2.7 lb (1.2 kg) weighted glass plate. One side of the glass plate was applied to one side of the second film at an angle of about 30 degrees and then gradually lowered to a horizontal position so that the second film was applied incrementally to the first film to avoid forming bubbles in the adhesive composition. Sufficient adhesive composition was applied to the first film to provide minimum bond dimensions of 1 inch (2.5 cm) in width by 1.5 inch (3.8 cm) in length.

The adhesive composition was allowed to cure for 24 hours at room temperature (i.e., about 20° C. to 22° C.). The bonded composites were then trimmed to a width of 1 inch (2.5 cm) and allowed to cure at room temperature for an additional 24 hours. The samples were then tested for peel bond strength in the T-peel mode using a tensile testing machine operating at a crosshead speed of 4 inches/min (10.2 cm/min). Two overlapping free ends of the sample were clamped into the jaws of the tensile tester, one free end in the upper jaw and the other free end in the lower jaw. The jaws were then pulled apart until at least 1 inch (2.5 cm) of adhesive was exposed or until adherend failure was observed. The test was carried out at room temperature. The average force per width during the test after the adhesive was initially exposed was recorded as the peel strength in pounds/inch width (piw) and then converted to Newtons/cm (N/cm). The reported values are based on a single measurement and are shown to one place following the decimal point.

Preferably, the peel strength values of the adhesives were at least about 10 piw (17.5 N/cm), more preferably at least about 20 piw (35 N/cm) for the HDPE, and at least about 5 piw (8.8 N/cm), more preferably at least about 10 piw (17.5 N/cm) for the LDPE.

Work-Life Test Method

Bonds were prepared according to the Overlap Shear Bond Strength Test Method, except that after each adhesive composition was applied directly onto the first untreated HDPE test panel, the adhesive composition was allowed to stand at room temperature for five minutes or for ten minutes before the second HDPE test panel was placed against the adhesive composition.

The embodiments for which an exclusive property or privilege is claimed are defined as follows:

1. A composition comprising organoborane amine complex and 1,4-dioxo-2-butene-functional material, wherein the 1,4-dioxo-2-butene-functional material is independently terminated with a group selected from the group consisting of monovalent alkyl, monovalent aryl, and monovalent alkylaryl groups.

2. A composition according to claim 1 wherein the 1,4-dioxo-2-butene-functional material includes a functional group having the structure

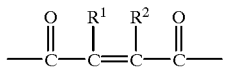

wherein $R^1$ and $R^2$ cooperate to form a cycloalkyl group or are independently selected from the group consisting of hydrogen, alkyl groups, aryl groups, alkylaryl groups, and halogen.

3. A composition according to claim 2 wherein $R^1$ and $R^2$ are independently selected from hydrogen and alkyl groups.

4. A composition according to claim 3 wherein $R^1$ is hydrogen and $R^2$ is a lower alkyl group.

TABLE 3

| Ex. | Initiator Mixture | Polymerizable Monomer Mixture | Weight % TEB*HMDA Complex | Overlap Shear Bond Strength | | | Peel Bond Strength | | Overlap Shear Bond Strength After Work Life of | |
|---|---|---|---|---|---|---|---|---|---|---|
| | | | | PP (psi (MPa)) | HDPE (psi (MPa)) | Montell 186A (psi (Mpa)) | HDPE (piw (N/cm)) | LDPE (piw (N/cm)) | 5 minutes (psi (MPa)) | 10 minutes (psi (MPa)) |
| 3 | I-1 | M-1 | 20 | 921 (6.35) | 767 (5.29) | 321 (2.21) | 16.2 (28.4) | 6.1 (10.7) | 671 (4.63) | 629 (4.34) |
| 4 | I-1 | M-2 | 20 | 835 (5.76) | 772 (5.32) | 232 (1.60) | 28.5 (49.9) | 3.2 (5.6) | 730 (5.03) | 723 (4.98) |
| 5 | I-1 | M-3 | 20 | 864 (5.96) | 773 (5.33) | 300 (2.07) | 46.7 (81.8) | 12.7 (22.2) | 768 (5.30) | 636 (4.39) |
| 6 | I-1 | M-4 | 20 | 751 (5.18) | 771 (5.32) | 319 (2.20) | 32.0 (56.0) | 18.8 (32.9) | 771 (5.32) | 693 (4.78) |
| 7 | I-2 | M-1 | 20 | 1044 (7.20) | 772 (5.32) | 76 (0.52) | 2.2 (3.9) | 0.7 (1.2) | 736 (5.07) | 530 (3.65) |
| 8 | I-3 | M-1 | 20 | 982 (6.77) | 779 (5.37) | 169 (1.17) | 0.7 (1.2) | 0.5 (0.9) | 737 (5.08) | 503 (3.47) |
| 9 | I-2 | M-2 | 20 | 1037 (7.15) | 749 (5.16) | 305 (2.10) | 15.4 (27.0) | 1.1 (1.9) | 748 (5.16) | 649 (4.47) |
| 10 | I-2 | M-3 | 20 | 1001 (6.90) | 756 (5.21) | 328 (2.26) | 38.8 (67.9) | 14.9 (26.1) | 728 (5.02) | 629 (4.34) |
| 11 | I-2 | M-4 | 20 | 979 (6.75) | 775 (5.34) | 243 (1.68) | 40.8 (71.5) | 14.0 (24.5) | 773 (5.33) | 715 (4.93) |
| 12 | I-3 | M-2 | 20 | 943 (6.50) | 786 (5.42) | 312 (2.15) | 12.1 (21.2) | 4.0 (7.0) | 772 (5.32) | 732 (5.05) |
| 13 | I-3 | M-3 | 20 | 775 (5.34) | 783 (5.40) | 375 (2.59) | 17.1 (29.9) | 3.4 (6.0) | 782 (5.39) | 725 (5.00) |
| 14 | I-3 | M-4 | 20 | 1003 (6.92) | 888 (6.12) | 271 (1.87) | 26.1 (45.7) | 8.3 (14.5) | 789 (5.44) | 706 (4.87) |
| 15 | I-4 | M-3 | 10 | 485 (3.34) | 759 (5.23) | Not run | 4.1 (7.2) | 3.0 (5.3) | 652 (4.50) | 516 (3.56) |
| 16 | I-5 | M-4 | 10 | 725 (5.00) | 744 (5.13) | 364 (2.51) | 33.0 (57.8) | 2.7 (4.7) | 670 (4.62) | 660 (4.55) |
| 17 | I-6 | M-2 | 10 | 255 (1.76) | 971 (6.69) | Not run | 7.7 (13.5) | 1.6 (2.8) | 804 (5.54) | 759 (5.23) |
| 18 | I-7 | M-2 | 30 | 929 (6.41) | 743 (5.12) | 278 (1.92) | Not run | Not run | 757 (5.22) | 383 (2.64) |
| 19 | I-8 | M-1 | 30 | 1067 (7.36) | 550 (3.79) | 234 (1.61) | 11.3 (20.0) | 1.2 (2.1) | 461 (3.18) | 375 (2.59) |
| 20 | I-8 | M-2 | 30 | 916 (6.32) | 782 (5.39) | 261 (1.80) | Not run | Not run | 780 (5.38) | 601 (4.14) |
| 21 | I-9 | M-2 | 30 | 540 (3.72) | 790 (5.45) | 319 (2.20) | Not run | Not run | 701 (4.83) | 583 (4.02) |
| 22 | I-9 | M-3 | 30 | 1102 (7.60) | 866 (5.97) | 193 (1.33) | 8.4 (14.7) | 2.6 (4.6) | 790 (5.45) | 126 (0.87) |
| 23 | I-10 | M-5 | 30 | 989 (6.82) | 926 (6.39) | 309 (2.13) | Not run | Not run | Not run | Not run |

The data show that compositions according to the invention incorporating a 1,4-dioxo-2-butene-functional material can provide acrylic monomer polymerization initiator systems when combined with a complex of organoborane and amine, and a material reactive with amine. Polymerizable acrylic compositions made therewith provide acrylic adhesives that can be packaged in an easily dispensed two-part form. The adhesives offer good adhesion to low surface energy substrates such as polypropylene, polyethylene, and polytetrafluoroethylene that historically have been very difficult to bond.

Numerous modifications and variations of the invention will be readily apparent to those skilled in the art without departing from the scope of the invention, which is defined by the accompanying claims.

5. A composition according to claim 4 wherein $R^1$ is hydrogen and $R^2$ is $CH_3$.

6. A composition according to claim 2 wherein $R^1$ and $R^2$ are each hydrogen.

7. A composition according to claim 1 wherein the 1,4-dioxo-2-butene-functional material has the structure:

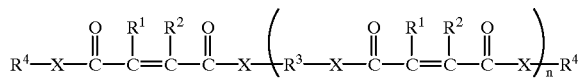

wherein:

$R^1$ and $R^2$ independently cooperate to form a cycloalkyl group or are independently selected from the group consisting of hydrogen, alkyl groups, aryl groups, alkylaryl groups, and halogen;

$R^3$ is a divalent organic linking group;

$R^4$ is selected from the group consisting of monovalent alkyl, monovalent aryl, and monovalent alkylaryl groups;

X is selected from the group consisting of oxygen, substituted amino and sulfur; and n is the number of repeating units encompasses by the parentheses.

8. A composition according to claim 7 wherein:

$R^1$ and $R^2$ are independently selected from hydrogen and lower alkyl groups;

$R^3$ is independently selected from the group consisting of divalent alkylene and divalent arylene groups;

X is independently selected from the group consisting of oxygen and substituted amino groups; and n is selected such that the 1,4-dioxo-2-butene-functional material has a number average molecular weight of about 10,000 or less.

9. A composition according to claim 8 wherein:

$R^1$ and $R^2$ are independently selected from the group consisting of hydrogen and methyl;

$R^3$ is independently selected from the group consisting of divalent alkylene and divalent arylene groups;

$R^4$ is independently selected from the group consisting of monovalent alkyl, monovalent aryl and monovalent alkylaryl groups;

X is independently selected from the group consisting of oxygen and substituted amino groups; and n is selected such that the 1,4-dioxo-2-butene-functional material has a number average molecular weight of about 400 or less.

10. A composition according to claim 1 wherein the 1,4-dioxo-2-butene-functional material is selected from the group consisting of:

1,4-dialkoxy-1,4-dioxo-2-butenes; 1,4-bis(dialkylamino)-1,4-dioxo-2-butenes; 1,4-bis(alkylamino)-1,4-dioxo-2-butenes; 1-alkylamino-4-alkoxy- 1,4-dioxo-2-butenes; and 1-dialkylamino-4-alkyloxy-1,4-dioxo-2-butenes; and combinations thereof.

* * * * *

UNITED STATES PATENT AND TRADEMARK OFFICE
CERTIFICATE OF CORRECTION

PATENT NO.    : 6,252,023 B1
DATED         : June 26, 2001
INVENTOR(S)   : Dean M. Moren It is certified that error appears in the above-identified patent and that said Letters Patent is hereby corrected as shown below:

<u>Title page, Item [54] and Column 1, line 2,</u>
Title, "INATATOR" should read -- INITIATOR --;

<u>Column 4,</u>
Line 38, "including at least one functional group having the structure" should be moved up to line 32 after "that";

<u>Column 9,</u>
Line 18, "thereof Useful" should read -- thereof. Useful --;

<u>Column 13,</u>
Line 23, "thereof Examples" should read -- thereof. Examples --;

<u>Column 27,</u>
Line 11, "encompasses" should read -- encompassed --.

Signed and Sealed this

Twentieth Day of August, 2002

Attest:

JAMES E. ROGAN
Director of the United States Patent and Trademark Office

Attesting Officer

UNITED STATES PATENT AND TRADEMARK OFFICE
CERTIFICATE OF CORRECTION

PATENT NO.     : 6,252,023 B1
DATED          : June 26, 2001
INVENTOR(S)    : Moren, Dean M.

It is certified that error appears in the above-identified patent and that said Letters Patent is hereby corrected as shown below:

Column 12,
Line 56, delete "nlolccllar" and insert in place thereof -- molecular --;

Column 13,
Line 43, delete "organbborane" and insert in place thereof -- organoborane --;
Line 46, "ofmaterials" should read -- of materials --;

Column 14,
Line 53, "nay" should read -- may --;

Column 16,
Line 31, "usefiul" should read -- useful --;

Column 18,
Line 27, "cornprise" should read -- comprise --;

Column 20,
Line 16, "ate" should read -- are --;

Column 24,
Line 45, "Plagtics" should read -- Plastics --.

Signed and Sealed this

Twenty-eighth Day of January, 2003

JAMES E. ROGAN
*Director of the United States Patent and Trademark Office*